United States Patent [19]
Thornton et al.

[11] Patent Number: 5,982,325
[45] Date of Patent: Nov. 9, 1999

[54] METHOD FOR TRACKING REAL TIME ROAD CONDITIONS

[75] Inventors: Kevin M. Thornton, Johnston; David L. Hattey, Marshalltown, both of Iowa

[73] Assignee: Racom Corporation, Marshalltown, Iowa

[21] Appl. No.: 08/976,625

[22] Filed: Nov. 24, 1997

[51] Int. Cl.[6] .................................................. H04B 7/185
[52] U.S. Cl. ...................................................... 342/357.07
[58] Field of Search ............................... 342/357; 701/50

[56] References Cited

U.S. PATENT DOCUMENTS

| | | | |
|---|---|---|---|
| 5,365,451 | 11/1994 | Wang | 342/357 |
| 5,504,491 | 4/1996 | Chapman | 342/357 |
| 5,650,770 | 7/1997 | Schlager | 340/573 |
| 5,731,785 | 3/1998 | Lemelson | 342/357 |

OTHER PUBLICATIONS

Winter Roads Condition, Oct. 2, 1997, Iowa Department of Transportation Internet Page.

*Primary Examiner*—Gregory C. Issing
*Assistant Examiner*—Devin Earl Drummond
*Attorney, Agent, or Firm*—Zarley, McKee, Thomte, Voorhees & Sease

[57] ABSTRACT

The apparatus and method for monitoring real time road conditions of the present invention includes providing remote units with computers having GPS receivers for detecting location, and sensors for detecting environmental information. Each remote unit includes a transceiver which transmits the time stamped located and environmental information via a wireless communication system to a base station, where the information is processed and stored. The stored information at the base station may be accessed by telephone via a voice response unit, to permit a consumer to determine real time environmental conditions of a particular location within a region.

20 Claims, 1 Drawing Sheet

METHOD FOR TRACKING REAL TIME ROAD CONDITIONS

TECHNICAL FIELD

The method of the present invention relates generally to position monitoring, and more particularly to a method for tracking the position of one or more pieces of road equipment, detecting selected bits of data regarding that road equipment and the environment in which it is traveling, and accumulating the data at a central location for access and distribution to others.

BACKGROUND OF THE INVENTION

Every winter, drivers in areas of the country such as the upper midwest face hazardous driving conditions due to snow and ice accumulation on road surfaces. While every attempt is made by state, county, and city road crews to keep the roads safe, the scope of the task in changing weather conditions can be overwhelming. Drivers with the need to travel are unable to obtain comprehensive, accurate, up-to-date information on road conditions, resulting in journeys being taken in unsafe conditions, with an increased risk of accidents.

While many states provide a telephone "hot line" describing road conditions, the information is based upon observation only, and is not detailed, or necessarily scientifically accurate as to a wide variety of data. For example, observation alone cannot necessarily determine the road temperature, the ambient temperature, nor the time delay since the road had been last plowed, sanded, or salted. In addition, visual observation is necessarily confined to widely spaced apart locations, since a state patrol office has duties more important than radioing the road and weather conditions along each mile of road.

Another drawback of the current system of advising consumers as to road conditions is the fact that only major interstates and highways are described, and the road condition descriptions must necessarily cover very large sections of road, covering hundreds of miles, with only a very general description of road condition (i.e. "50%–100% snow and ice covered").

SUMMARY OF THE INVENTION

Consequently, it is a primary objective of the present invention to provide a method for detecting real time road conditions throughout a region and accumulating this data at a central location accessible by others.

It is a further objective to provide a method of detecting real time road conditions which can detect "environmental data" such as ambient temperature, road temperature, time of last plowing, sanding, salting, and the like.

An additional objective is to provide a method of detecting real time road conditions on all roads throughout a region and at very short distance intervals on the roads.

These and other objectives will be apparent to those skilled in the art.

The apparatus and method for monitoring real time road conditions of the present invention includes providing remote units with computers having GPS receivers for detecting location, and sensors for detecting environmental information. Each remote unit includes a transceiver which transmits the time stamped located and environmental information via a wireless communication system to a base station, where the information is processed and stored. The stored information at the base station may be accessed by telephone via a voice response unit, to permit a consumer to determine real time environmental conditions of a particular location within a region.

DESCRIPTION OF THE PREFERRED EMBODIMENT

Figure 1:
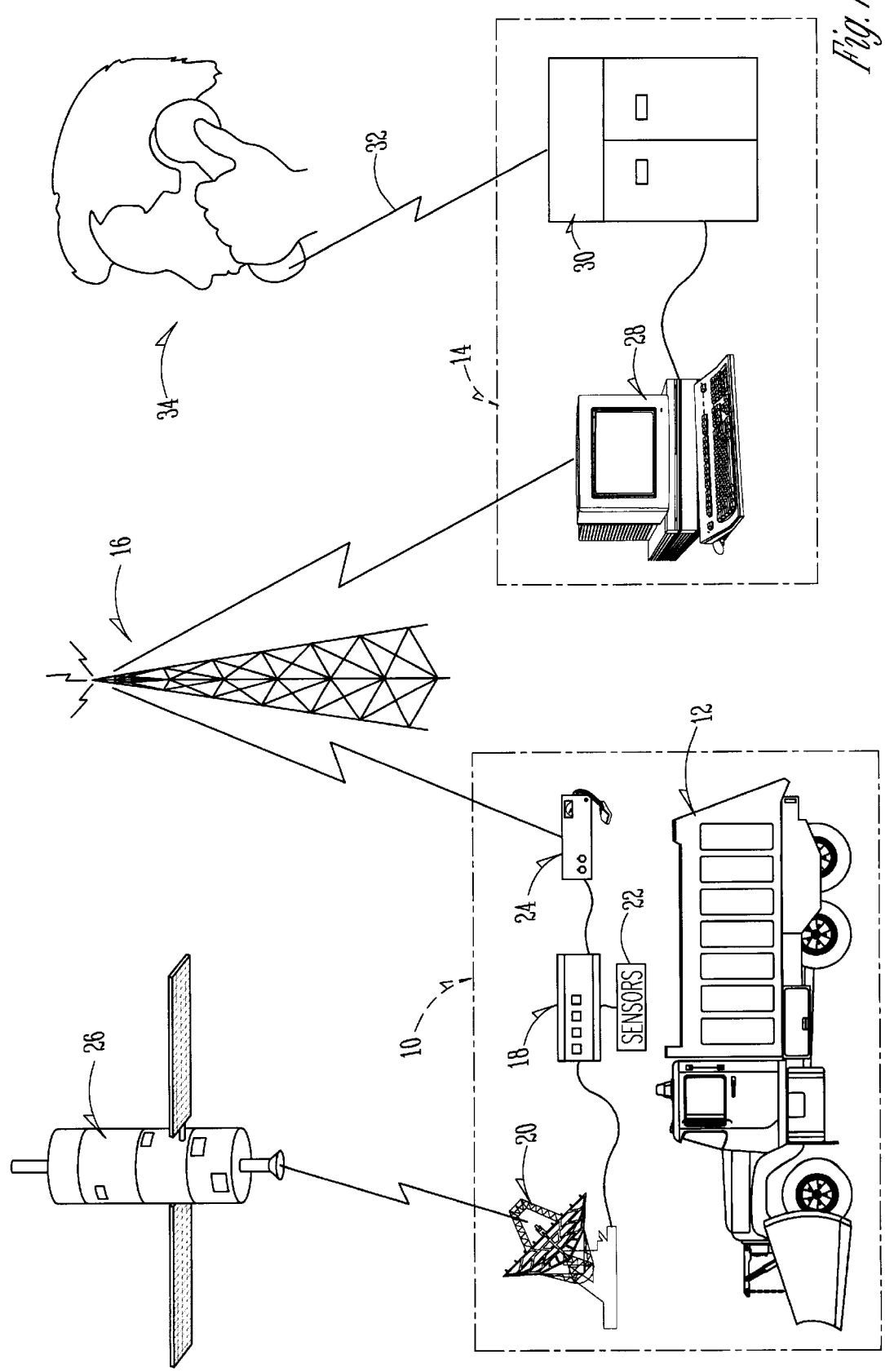
FIG. 1 is a pictorial schematic representation of the overall operational environment of the method of the present invention.

The goal of the present invention is to provide a means for tracking the geographic position of one or more vehicles, detecting the ambient and road conditions surrounding that vehicle, and storing the information at a central data base for easy access by consumers.

To accomplish this goal, the present invention utilizes the convergence of technologies such as global positioning systems (GPS), automated vehicle location (AVL), wireless data communications, and voice response units (VRU).

The GPS satellite system is well described in other literature. Suffice it to say that GPS receivers can monitor from four to eight satellites in geostationary orbit around the earth and accurately determine position to within a meter, using differencing techniques.

Differential GPS is a technique for compensating for errors in GPS measurements in a localized region. The technique requires a GPS reference receiver at a fixed site, such as a central base station. This reference receiver establishes correction data to correct for errors in GPS transmissions that would be encountered by the mobile receivers in their region. The corrections can either be transmitted to the mobile units over a data link and applied directly at the mobile units, or the corrections can be made at the central site using a technique called inverted differential GPS.

AVL, which utilizes GPS to obtain location fixes, ascertains a variety of different types of information. For example, AVL may determine current location of a vehicle, and may be within an assortment of sensors and an on-board computer to determine vehicle speed, position of a snowplow blade (raised or lowered) whether sand or salt have been applied, air temperature, pavement temperature, and related "environmental data". Since these functions are "event driven", there is an ability to determine in real time if a particular section of road has been plowed, and if so, how recently, as well as the surface condition of the road and ambient air temperature at a particular time. All of this data may be transmitted by wireless communications to a monitoring site where the information may be monitored, stored and dispensed to others via a VRU.

These technologies are utilized in a method of the present invention to provide for large scale remote monitoring of road conditions in "real time". The apparatus and method operates generally at follows. A remote unit would be attached to a plurality of snowplows and other road equipment, utilized throughout a specified region. Each remote unit would include "monitoring components" as well as apparatus for transmitting the monitored information to a base location. For monitoring position, the remote unit would include a GPS receiver processor capable of receiving and processing GPS signals and determining a position therefrom. Additionally, the monitoring of "environmental data" would be accomplished through various sensors adapted to detect and monitor the desired parameter—such as vehicle speed, raised or lowered condition of a snowplow, distribution of sand, and/or distribution of salt, as well as ambient temperature and road pavement temperature. All of this information would be processed on an AVL on-board computer and transmitted through a wireless communication device, such as a data capable radio.

The central or base site would be equipped with an AVL computer containing maps and tracking software, a VRU, and a bank of phone lines. The base station computer establishes and maintains a data base of all location and environmental data transmitted the wireless communications from the remote units. This computer may include a display screen for displaying the data graphically to monitoring personnel.

The base station computer is tied to a voice response unit which permits individuals to telephone into the voice response unit and interact with the data base of information to determine "real time"road conditions at any particular location.

The components comprising the present invention are illustrated in FIG. 1. The major components of the present invention may be divided into two categories. The first category includes the remote unit 10 which is mounted on a vehicle 12. The second category includes those components which reside at a base station 14. These two groups of components are operably interconnected. by a wireless communication system, designated generally at 16.

The remote unit 10 includes an AVL on-board computer 18 which is operably connected to a GPS antenna 20, a plurality of sensors 22 distributed about vehicle 12, and a transceiver 24 for communication with base station 14. Computer 18 may be of any conventional variety which include memory and a central processor for processing information from the GPS antenna 20 and sensors 22 and transmitting that information via transceiver 24 to the base station 14. The computer should include a GPS receiver, connected to the GPS antenna 20 which is operative to receive ranging signals transmitted from global positioning satellites 26 in geostationary orbit above the earth. As is well understood in the art, the GPS receiver in computer 18 is capable of receiving the ranging signals from the GPS satellites 26 via antenna 20 and converting this information into geographical latitude and longitude. This information is then transferred to and used by computer 18.

As discussed above, sensors 22 are mounted about vehicle 12 to detect various environmental conditions, and to transmit signals to the computer 18 with data regarding the sensed conditions. Some of the basic parameters which computer 18 may monitor include ambient air temperature, road pavement temperature, raised/lowered position of a snowplow blade, activation/operation of sanding apparatus, activation/operation of salting apparatus, and vehicle speed. All of this formation is detected by sensors 22, transmitted to computer 18, and processed in computer 18 along with the vehicle location (received by the GPS receiver) and time stamped. The information is then periodically transmitted via transceiver 24 through wireless communication system 16 to base station 14.

Base station 14 includes a central computer 28 which receives positioning and environmental data downloaded via wireless communication system 16. Preferably, central computer 28 is equipped with maps and tracking software as well as a data base for receiving, storing and monitoring information received from the remote unit 10.

In the preferred embodiment of the invention, base station 14 will include a voice response unit 30 operably connected to computer 28 and operably connected to a bank of telephone lines 32 to permit access of the information by various consumers 34. An interface between the central computer 28 and VRU, known as computer telephony integration (CTI) permits the information in the computer data base to be accessible via telephone lines 32 and permits the information to be transmitted over the telephone lines verbally. CTI interfaces are well known in the industry, and are widely used by airlines, insurance companies and governmental agencies.

In use, a consumer 34 may dial in to the VRU 30 using a conventional telephone line 32. The VRU provides an interface to the data base of computer 28, permitting consumer 34 to specifically enter locations of specific roads, to determine the current road condition and surrounding environmental data regarding that particular location. For example, if the consumer desired information as to the road condition of highway 330, the VRU could request that the consumer enter the number of the highway desired, by pushing buttons on the telephone. The VRU would then interface with base station computer 28 and access the most current data received from a remote unit 10, and transmit this information verbally by indicating the last time that a snowplow had passed over the particular road, whether salt and sand had been applied, as well as the current air temperature and road temperature along that particular highway. Because information is constantly received from the various remote units 10, the VRU would be capable of providing "real time" information to consumers 34.

Whereas the invention has been shown and described in connection with the preferred embodiment thereof, many modifications, substitutions and additions may be made which are within the intended broad scope of the appended claims.

We claim:

1. An apparatus for monitoring a mobile remote unit and the environmental conditions around the mobile remote unit from a base station and for storing the monitored information and providing access to the information via telephone, comprising:

a mobile remote unit having a computer with means for determining the geographic position of the remote unit at predetermined time intervals;

an environmental sensor disposed on the mobile remote unit for sensing road conditions;

said computer receiving position signals from the position determining means and having a processor for processing each position signal with a time stamp, and for storing the time stamped signals;

communication means carried on the mobile remote unit and connected to the computer, for transmitting data from the mobile remote unit to a base station;

said computer programmed to accumulate said time stamped position signals and sensed road conditions for a predetermined time interval and to transmit accumulated signals as a download through the communication means to the base station;

said base station located remote from the mobile remote unit and including communication means for receiving downloads from the mobile remote unit;

said base station including a programmable computer with memory storage, connected to the communication means, for receiving, processing and storing downloads from the mobile remote unit;

said base station including a voice response unit interfaced with the computer and at least one telephone line, for interacting with a consumer on the telephone line and providing verbal information from the computer to the consumer.

2. The apparatus of claim 1, wherein said computer includes display means for displaying a map of a selected download.

3. The apparatus of claim 1, wherein said means for determining the geographic position of the mobile remote unit includes:

a receiver for receiving ranging signals from a plurality of global position system (GPS) satellites; and said mobile remote unit computer connected to the receiver and operable to process and store the GPS ranging signals and to determine the position of the mobile remote unit therefrom.

4. A method of monitoring a mobile remote unit and the environmental conditions around the mobile remote unit from a base station and for storing the monitored information and providing access to the information via telephone, comprising the steps of:

provide a mobile remote unit with a computer having means for determining the geographic position of the mobile remote unit, a plurality of sensors for detecting environmental data surrounding the mobile remote unit, and a transmitter for transmitting data from the mobile remote unit to a base station;

said computer processing and time stamping signals from the position determining means, to determine the location of the mobile remote unit at predetermined time stamped intervals;

said computer processing the detected environmental data from the sensors and associating the data with the time stamped position signals;

said computer accumulating the time stamped position signals and associated environmental data and storing them in memory;

said computer transmitting a set of accumulated time stamped position signals and environmental data at a predetermined time interval to a base station; and a computer at the base station receiving, processing, storing and selectively displaying the time stamped position signals and environmental data from the mobile remote unit.

5. The method of claim 4, further comprising the steps of:

providing a voice response unit at said base station, connected to the base station computer and at least one telephone line, for interacting with the base station computer and for providing information from the base station computer via the telephone line; and accessing the voice response unit via the telephone line to access environmental data from the base station computer downloaded from the mobile remote unit.

6. The method of claim 4, wherein the step of providing position determining means includes providing the mobile remote unit with a receiver for receiving ranging signals from a plurality of GPS satellites.

7. The method of claim 4, further comprising the steps of: providing a plurality of mobile remote units, each mobile remote unit having:

a computer with means for determining the geographic position of the mobile remote unit, a plurality of sensors for detecting environmental data surrounding the mobile remote unit, and a transmitter for transmitting data from the mobile remote unit to a base station;

each said computer processing and time stamping position signals from the position determining means, to determine the location of the mobile remote unit at predetermined time stamped intervals;

each said computer processing the detected environmental data from the sensors and associating the data with the time stamped position signals;

each said computer accumulating the time stamped position signals and associated environmental data and storing them in memory; and each said computer transmitting a set of accumulated time stamped position signals and environmental data at a predetermined time interval to a base station; and each base station computer receiving, processing, storing and selectively displaying the time stamped position signals and environmental data from the mobile remote units.

8. An apparatus for providing conditions of a road to a remote user comprising:

a vehicle having a position locator device for determining the location of the vehicle at a given time;

a radio transmitter on the vehicle for transmitting information including information relating to the location of the vehicle;

a base station for taking the information from the vehicle and providing the information to a remote user; and a sensor disposed on the vehicle for sensing a road condition, for transmission to the base station along with the vehicle location information, wherein the information provided to the remote user includes data based on the sensed road condition.

9. The apparatus of claim 8 further comprising a second sensor disposed on the vehicle for sensing an operating condition of the vehicle, wherein the information provided to the remote user includes information based on the sensed operating condition of the vehicle.

10. The apparatus of claim 9 wherein the vehicle is comprised of a snowplow, and the second sensor senses whether or not the snowplow is plowing.

11. The apparatus of claim 10 wherein the information provided to the remote user includes whether the road on which the snowplow is traveling has been plowed by the snowplow.

12. The apparatus of claim 8 wherein the base station provides the information to the remote user via telephone lines.

13. A method of providing information relating to road conditions to a remote user comprising the steps of:

providing a plurality of service vehicles each having a position locating device for determining the location of the vehicle and a radio transmitter for transmitting information to a central location;

for each of the plurality of service vehicles, sensing a condition of the road and transmitting information relating to the sensed road condition and the location of the vehicle to the central location;

processing the transmitted information to provide road condition information for roads on which the vehicles are traveling; and providing the road condition information to a remote user.

14. The method of claim 13 wherein the plurality of vehicles are each comprised of a snowplow.

15. The method of claim 14 wherein the sensed operating condition is whether the snowplow is plowing snow.

16. The method of claim 13 wherein the road condition information is provided to the remote user over a telephone line.

17. The method of claim 13, further comprising the steps of: prompting the remote user to select a specific road; and providing road condition information to the remote user relating to a specific road selected by the remote user.

18. The method of claim 13 further comprising the step of tracking the plurality of service vehicles over time to determine which roads have been covered by the service vehicles and when the roads were covered by the service vehicles.

19. The method of claim 13 wherein the service vehicle includes a road sanding apparatus, and wherein the sensed operating condition is whether the sanding apparatus is activated.

20. The method of claim 13 wherein the service vehicle includes a road salting apparatus, and wherein the sensed operating condition is whether the salting apparatus is activated.

* * * * *